United States Patent [19]
Rosenblum

[11] 3,812,972
[45] May 28, 1974

[54] LIQUID FILTER AND METHOD FOR FABRICATING SAME
[76] Inventor: Jesse Rosenblum, 112 Roosevelt St., Closter, N.J.
[22] Filed: May 2, 1972
[21] Appl. No.: 249,711

[52] U.S. Cl.............. 210/489, 210/492, 210/498, 210/506
[51] Int. Cl............................................. B01d 25/18
[58] Field of Search ....................... 210/488–490, 210/492, 496, 498, 500, 506

[56] References Cited
UNITED STATES PATENTS

| | | | |
|---|---|---|---|
| 2,582,272 | 1/1952 | Pamp, Jr. | 210/492 |
| 3,052,360 | 9/1962 | Imershein | 210/488 X |
| 3,303,085 | 2/1967 | Price et al. | 210/498 X |
| 3,359,192 | 12/1967 | Heinrich et al. | 210/498 X |
| 3,648,843 | 3/1972 | Pearson | 210/488 X |

FOREIGN PATENTS OR APPLICATIONS

| 30,303 | 12/1909 | Great Britain | 210/498 |
|---|---|---|---|

Primary Examiner—John Adee
Assistant Examiner—Robert H. Spitzer
Attorney, Agent, or Firm—Hubbell, Cohen & Stiefel

[57] ABSTRACT

A liquid filter including at least two filter members having continuously contacting opposing surfaces, the members each being fabricated of a non-porous material, wherein at least a segment of a liquid flow path through the filter is defined at the interface of the contacting surfaces.

A method of manufacturing the above filter comprising the steps of forming a groove in at least one of the opposing surfaces of the filter members and then mounting the filter members together in continuous superimposed contacting relation with the groove lying at the interface and defining at least a segment of a liquid flow path through the filter at said interface. In a preferred embodiment, the forming step includes chemical etching and the mounting step includes diffusion bonding.

12 Claims, 9 Drawing Figures

PATENTED MAY 28 1974 3,812,972
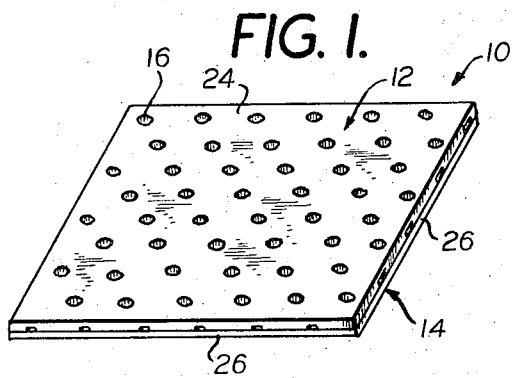
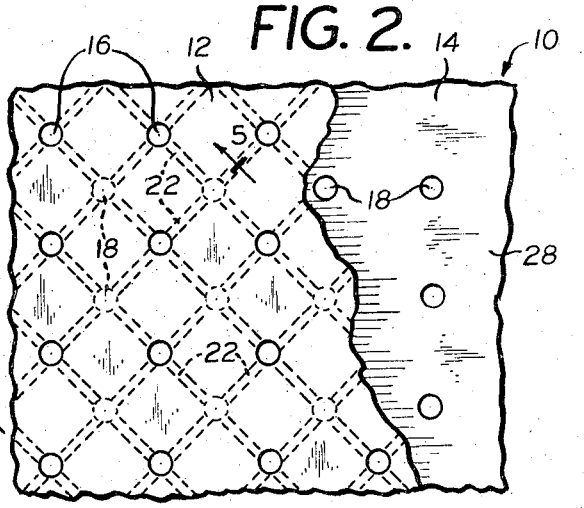
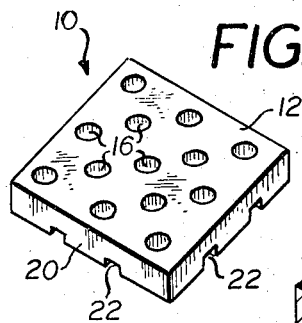
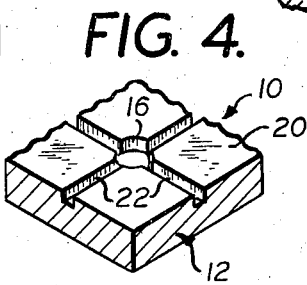
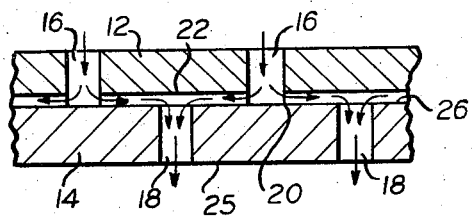
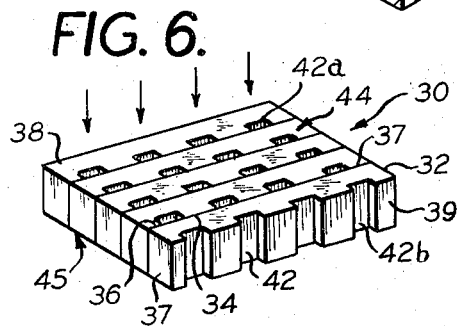
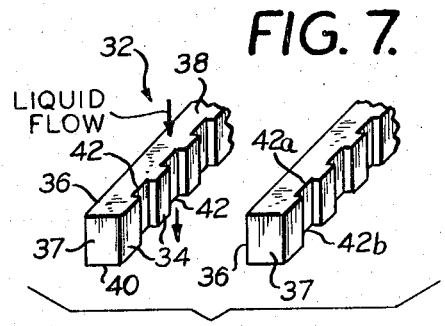
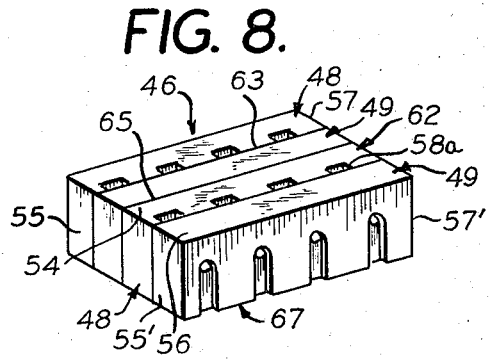
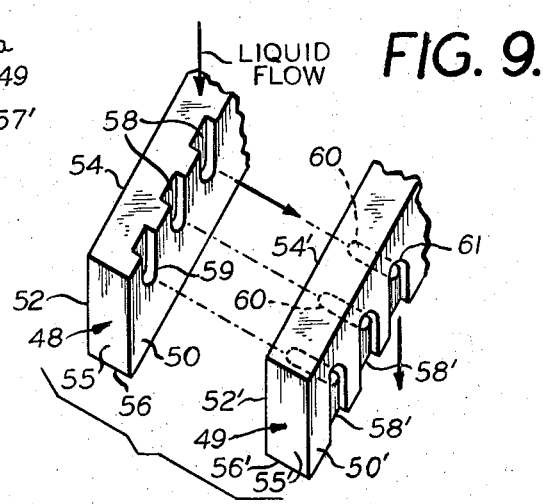

LIQUID FILTER AND METHOD FOR FABRICATING SAME

BACKGROUND OF THE INVENTION

1. Field of the Invention

This invention relates to liquid filtration and, more particularly, to liquid filters of the type having at least two filter members joined together with one or more liquid flow paths being defined between the members. Additionally, this invention relates to a method of fabricating liquid filters of the above type.

2. Description of the Prior Art

Liquid filters of the general type above described are known in the art. For example, U.S. Pat. No. 3,052,360 to Imershein shows a filtering septum formed by a pair of superimposed metal sheets each of which has a multiplicity of holes in the same spatial pattern, with the holes of one sheet being completely out of register with the holes in the opposing sheet. The holes in each sheet have marginal burrs which bear against an unperforated portion of the opposing metal sheet. The hole burrs maintain a separation between the unperforated portions of the opposing sheets so as to define a multiplicity of tortuous liquid flow paths interconnecting the holes of one sheet with the offset holes of the other sheet.

The liquid filter of Imershein suffers from a significant disadvantage in that the metallic sheets are subject to corrosion and cracking due to prolonged stress in the burr areas. Furthermore, and as shown in the Imershein patent, each burr has a ragged edge which bears against the opposing unperforated area of the opposing sheet, the ragged edge restricting the liquid flow past the burr. This has the result of causing the burr areas of the sheets to clog up frequently, thereby requiring correspondingly frequent backwashing and filter cleansing.

Another liquid filter of the same general type as that of Imershein is shown in U.S. Pat. No. 3,360,133 to Proulx. Proulx shows an oil filter cartridge having a plurality of filter discs and a plurality of separator discs stacked alternately. The discs are each of a foraminous, or porous, material. The separator discs are provided with circumferentially arranged cutout portions which, in conjunction with the opposing walls of the adjacent filter discs, form cells or chambers in the assembled cartridge. Some of the cutout portions are of trapezoidal configuration, whereas the other cutout portions are of sinusoidal configuration. The separator discs are stacked relative to one another in a manner so that the trapezoidal cutouts of one are aligned with the sinusoidal cutouts of the next closest separator disc.

An inlet passage is provided from the exterior of the filter through the filter discs to each of the trapezoidal cutouts, and outlet passages are provided into the central interior of the filter through the separator discs from the sinusoidal cutouts. Each adjacent pair of separator and filter discs have contacting opposing faces, with the chambers formed by the trapezoidal and sinusoidal cutout portions lying in the interface area. As liquid is introduced into the trapezoidal chambers of a separator disc, it passes through the porous material of the separator disc, through the adjacent filter disc, into the sinusoidal chamber of the next adjacent separator disc, and then out of the filter.

The filter cartridge of Proulx is specifically designed to filter liquid having a much higher viscosity than water, such as engine oil. Accordingly, the discs are made of a porous material, and the trapezoidal and sinusoidal cutouts, as well as the input and output passages, are relatively large compared with the overall dimension of the discs. It would be extremely inefficient to use the filter of Proulx to filter liquids having a viscosity substantially lower than engine oil, such as water. Water would quickly pass through the pores of the discs and would not follow the path defined by the chambers. The water flow would be predominantly downward and not predominantly inward as is required in the Proulx filter.

Many processes exist by which a filter may be fabricated with one or more liquid flow paths defined at the interface of a pair of superimposed filter members. In one process, for example, holes are punched through a pair of plates in a manner so as to define marginal burrs about the periphery of each hole, the plates being contacted at the opposing surfaces bearing such burrs (see the Imershein patent). In another process, one filter member of the pair may have various segments cut out of an opposing surface to form chambers at the interface of the pair. To applicant's knowledge, however, this latter process has been employed only with respect to foraminous filter members used primarily to filter highly viscous liquids, such as engine oil (see the Proulx patent).

Foraminous filter members are to be expressly distinguished from nonporous filter members. A foraminous material is one which contains pores as part of its inherent physical constitution. A nonporous material, such as metal, on the other hand, contains no such pores. Holes may be formed in a nonporous material to thereby form a perforated material. However, such perforated material itself is nonetheless nonporous.

With respect to nonporous filter members, such as sheet metal plates, conventional chemical etching techniques have been used to form holes through such filter members. For example, see U.S. Pat. No. 3,359,192 issued on Dec. 19, 1967 to Heinrich. However, to applicant's knowledge, a chemical etching process has not been used to form one or more filter paths at the interface of a pair of contacting nonporous filter members, such as superimposed metal plates.

SUMMARY OF THE INVENTION

This invention resides in the discovery that a highly efficient filter comprised of a pair of nonporous filter members may be fabricated by forming at least one groove in at least one surface of the pair of members and then joining the members together in surface to surface contact so that said groove lies at the interface, thereby defining at least a segment of a liquid flow path through the filter at the interface of the members. In accordance with the invention such a filter may be designed with a filtration capacity for a desired liquid of almost any viscosity by forming the filter with a predetermined number of liquid flow paths having predetermined dimensions, the number and dimensions of the flow paths being selected to accommodate the characteristics of the desired liquid. For example, a filter of this invention may be formed with a liquid flow path construction which enables the filter to be used in a process of treating raw sewage, separating sludge from the water.

In a preferred method of this invention, the pair of filter members are metallic and a plurality of grooves are formed in at least one contacting surface of the pair of filter members by a chemical etching process, such as a conventional photochemical or electrochemical etching process. The grooves each represent at least a segment of a separate liquid flow path through the filter. Chemical etching is preferred in forming such grooves since the grooves so formed are extremely precisely defined. Further, chemical etching enables the formation of a groove of almost any desired dimensions, e.g. 0.010 inch in depth, which is an important aspect of the method of this invention, as above described. For a complete description of the process of photochemical etching of thin metal parts, reference may be had to the August, 1970 edition of "Automation".

Further, the filter members are preferably affixed to each other by a conventional diffusion bonding process. Diffusion bonding is accomplished by joining two or more members constituted of identical heat deformable material, such as plastics or metals, in a furnace having either a hydrogen atmosphere or vacuum. Then, the pressure is increased to maintain a surface to surface contact between the members, and the temperature is elevated sufficiently to cause the molecules at the interface to diffuse and intermingle, thereby forming a permanent bond between the two members which remains when the temperature is reduced.

In one specific embodiment of a filter of this invention, a pair of plates, each plate having a multiplicity of holes therethrough, are mounted together in superimposed contacting relation. The holes are arranged in the same spatial pattern on each plate, and the plates are so aligned that the holes in one plate are completely out of register with the holes in the other plate. A multiplicity of grooves are formed in at least one of the contacting plate surfaces, each such groove being positioned to provide a liquid flow path between a hole of each plate at the interface of the plates so that a multiplicity of tortuous liquid flow paths are defined through the filter.

This filter has a number of distinct advantages over the prior art filters above discussed. For one, there are no damaging hole burrs or the like as in the Imershein filter. Further, the filter of this invention is not restricted in application to filtration of highly viscous liquids, such as engine oil, as in the Proulx filter wherein foraminous filter members are used. Further, and unlike the filter of Proulx, the filter of this invention may use filter plates cut from a common sheet wherein the holes therein are perforated on a single device. Additionally, no special molds are needed to form the grooved plates, as in Proulx, such grooves being formable after the plate itself has been formed.

The filters of this invention can be designed with a selected hole and groove construction (i.e. number, arrangement and dimensions) which will enable them to provide effective filtration of substantially any preselected liquid. Further, the specific construction of the holes and grooves also determines, in part, the maximum liquid flow rate of the filter. More specifically, the greater the volume of liquid flow paths through the filter, the greater the liquid flow rate that can be handled before the filter breaks down. A balance must, of course, be struck between the viscosity of the liquid to be filtered and the rate of filtration in determining the number, arrangement and dimensions of the holes and grooves.

Other embodiments of the liquid filter of this invention, illustrated in FIGS. 6-9, comprise at least two filter members, each having a pair of opposing top and bottom surfaces, a pair of opposing end surfaces and a pair of opposing, substantially parallel sides, at least one side of each member being planar. The members are mounted to each other with a planar side of each in superimposed contacting relation with a planar side of the adjacent member, the top surface of adjacent filter members being coplanar. An elongate groove is formed in at least one of said contacting sides to provide a liquid flow path at the interface of the members.

In one specific embodiment of the above filter (FIGS. 6 and 7), the elongate groove extends between the top and bottom surfaces of the member in which it is formed to thereby define a straight liquid flow path through the filter. In use, filterable particles are trapped on the top surface of the filter.

In another specific embodiment of the above filter (FIGS. 8 and 9), the elongate groove extends from the top surface of a first member in which it is formed along a contacting side to a terminal point above the bottom surface of such first member. A second member includes a liquid flow path therethrough having an inlet end on a contacting side in communication with the groove at said terminal point of said contacting side of said first member and an outlet end at a surface of said second member which is not in contact with said first member. In this manner, a tortuous liquid filter path is defined through the filter.

These and other aspects and advantages of the present invention are more clearly described with reference to the accompanying drawing.

BRIEF DESCRIPTION OF THE DRAWING

FIG. 1 is a top perspective view of one embodiment of the filter of this invention;

FIG. 2 is a top plan view of a segment of the filter of FIG. 1 shown partly broken away to reveal a lower plate of the filter.

FIG. 3 is an enlarged perspective view of a segment of the top plate of the filter of FIG. 1;

FIG. 4 is an enlarged perspective view of the reverse side of another segment of the filter member shown in FIG. 3;

FIG. 5 is a cross-sectional view of the filter of FIGS. 1-4 taken along lines 5—5 of FIG. 2;

FIG. 6 is an enlarged top perspective view of a segment of another embodiment of the filter of this invention;

FIG. 7 is a fragmentary exploded perspective view of two adjacent segments of the filter of FIG. 6;

FIG. 8 is a top perspective view of yet another embodiment of the filter of this invention; and FIG. 9 is a fragmentary exploded view of two adjacent segments of the filter of FIG. 8.

DESCRIPTION OF THE ILLUSTRATED EMBODIMENTS

A liquid filter of this invention is of the general type having at least two filter members mounted together in superimposed contacting relationship, with one or more liquid flow paths being defined at the interface of the members. With reference to the drawings, one specific filter 10 of this invention is shown in FIGS. 1–5. Filter 10 comprises a pair of filter members in the form of plates 12 and 14, each plate being made of a noncorrosive, nonporous material, such as treated sheet metal, plastic or a ceramic.

Preferably, plates 12 and 14 are identical pieces of treated sheet metal wherein each plate is perforated with a multiplicity of holes 16 and 18, respectively. Preferably, holes 16 and 18 are of identical diameter and are arranged in the same spatial pattern on each plate. As shown in FIGS. 1 and 2, the spatial pattern is preferably one of a plurality of columns and rows.

Plates 12 and 14 are preferably cut from a common perforated sheet to any desired configuration, a square configuration being shown merely for purposes of illustration. Whichever shape and configuration is chosen for plates 12 and 14, however, it is essential that the plates be cut in a manner such that when they are placed in superimposed contacting relationship, as shown in FIG. 1, each and every hole 16 on plate 12 must be completely out of register with each and every hole 18 of plate 14, as shown in FIG. 2.

In accordance with this invention, at least one of the contacting surfaces of filter 10, such as bottom surface 20 of plate 12, for example (FIGS. 3 and 4), has a groove 22 formed therein. Preferably, there are a multiplicity of grooves in surface 20 which define a network of channels in bottom surface 20 of plate 12 at an interface 26 between the plates (see FIGS. 1 and 5). Each groove 22 is arranged on surface 20 in such manner as to provide liquid flow communication between at least one hole 16 of plate 12 and at least one hole 18 of plate 14 when the filter is properly assembled as shown in FIGS. 1 and 2. More specifically, it is important that each groove 22 extend from a hole 16 of plate 12 to a point on surface 20 that will be aligned and in liquid flow communication with a hole 18 of plate 14 when the two plates are mounted together in superimposed contacting relationship. This relationship is shown most clearly in FIG. 2.

Preferably, grooves 22 are arranged in a series of intersecting columns and rows interconnecting holes 16 on lower surface 20 of plate 12. Plate 14 is cut in such a manner that when the two plates are joined together each of holes 18 lies directly beneath a groove interconnecting two of holes 16 but out of register with any of holes 16 (FIGS. 2 and 5). Alternatively, if desired, additional or substitute grooves (identical to grooves 22) may be defined in the upper surface of plate 14. Such grooves (not shown) would connect holes 18 and function in the same manner as grooves 22. Where grooves 22 are also present, the additional grooves in cooperative alignment with grooves 22 in plate 12, would define channels of greater volume than those defined by grooves 22 alone. Another alternative in accordance with this invention would be to alternate the grooves with some being in the upper surface of plate 14 and some in the lower surface of plate 12.

Referring again to filter 10 and specifically to FIG. 5, a multiplicity of tortuous liquid flow paths are defined through filter 10 from holes 16 of plate 12 through communicating grooves 22 to holes 18 of plate 14. Thus, when liquid is impinged upon an upper surface 24 of plate 12, it will enter holes 16 and travel along the network of grooves 22 defined at interface 26 between the plates to holes 18 of plate 14 and exit the filter through holes 18 at lower surface 25 of plate 14. In this manner, filterable particles in the liquid entering holes 16 may be trapped in channels 22 between the plates, with filtered liquid exiting from holes 18. Occasionally, the filter should be backwashed to clear out the collected filterable particles, this being accomplished by running liquid through the filter in the reverse direction from holes 18 back through channels 22 to holes 16 and then out of the top of the filter.

As stated above, plates 12 and 14 are mounted together in superimposed contacting relation. Preferably, the plates are so mounted together by one or more conventional bonding techniques, such as diffusion bonding, which is the most preferred method, or spot welding or adhesive bonding.

In accordance with this invention, the network of grooves defined in surface 20 of plate 12 may be formed by any time saving method, preferably one not requiring the grooves to be manually carved into surface 20. For example, grooves 22 may be formed by conventional printing techniques wherein a ridge, borne on a stamp, is force-indented directly into a surface of one of the plates, such as surface 20 of plate 12. In an alternative method, grooves 22 may be defined by electrochemical depositing techniques wherein material may be bonded to a surface of one of the plates in all areas except where the grooves are to be defined. Electrochemical bonding is well known in the art. Reference may be had, for example, to the March, 1971 edition of "Materials Engineering", pages 40–47.

Other methods of forming grooves in plates 12 and 14 are also contemplated, such as "silk-screening" a pattern on each plate using epoxy inks, and such as coining or embossing the plates in a heavy press by dies or rollers. Both of these methods are conventional.

Preferably, grooves 22 are chemically etched into at least one of the contacting surfaces of the pair of filter members, e.g. surface 20 of filter member 12, and, most preferably, are photochemically etched into such surface. Photochemical etching is preferred since it enables grooves of almost any desired dimensions to be formed with precision and accuracy. For example, grooves less than 0.005 inch in width and less than 0.010 inch in depth may be formed on the surface of one of the plates of filter 10 with accuracy and precision.

Holes 16 and 18 may be formed in plates 12 and 14, respectively, by any known conventional technique. Although the spatial pattern of holes on each of plates 12 and 14 is shown to be identical, i.e. the holes each being of identical diameter with an identical spacing of rows and columns of holes on each plate, actually any spatial pattern of holes and hole diameters may be used for each plate so long as no holes in one plate are in register with any holes in an adjacent plate. Thus, the spatial patterns on one plate may differ from that on the other consistent with the above requirement.

As stated previously, as regards the fabrication of a filter of this invention, the viscosity of the liquid to be filtered will determine the number and diameter of the holes, as well as the dimensions of grooves 22. That is, the more viscous the liquid, the larger the diameter of the holes, the fewer the holes for a given surface area, and the greater the dimensions of the grooves. It will, of course, be appreciated that a prefabricated filter having a known hole and channel size, may be used to filter only liquids having viscosities within a particular range. The range is, of course, determined in advance either mathematically or on a trial and error basis.

It should, of course, be realized that, in addition to determining the range of liquid viscosity of the liquids that may be filtered in filter 10, the size, shape and configuration of holes 16 and 18, as well as grooves 22, also determine the maximum permissible flow rate through the filter. In short, the greater the volume of liquid flow passages through the filter, the greater the maximum liquid flow rate.

Specifically, and referring to filter 10, each of plates 12 and 14 is preferably approximately about 0.008 inch to 0.014 inch in thickness with each of holes 16 and 18 being approximately about 0.020 inch to 0.045 inch in diameter. As stated above, each plate may be cut to any desired geometric shape. Referring to grooves 22, they are each preferably approximately about 0.003 inch to 0.008 inch in depth and 0.003 inch to 0.015 inch in width. It has been found that the above ranges of dimensions of the plates, holes and grooves enable filter 10 to operate most effectively as a water filter.

In putting filter 10 to use, it should be noted that the edges of the filter are preferably sealed, thereby closing off the grooves at such edges to prevent peripheral leakage. (In the drawings filter 10 is not shown as being sealed merely for purposes of simplifying review of the drawings.) When the plates are metallic, the edges may be sealed by pinching the plates together at such edges. For ceramic plates, a sealant may be used.

In FIGS. 6 and 7, another embodiment of this invention, filter 30, is shown. Filter 30 comprises a plurality of filter members in the form of elongate bars 32 which are each preferably identical in shape and are preferably horizontally stacked. Each filter bar 32 is fabricated of a noncorrosive, nonporous material, such as treated sheet metal or plastic. Each filter bar 32 has opposing planar and preferably parallel sides 34 and 36, a pair of opposing top and bottom surfaces 38 and 40, which are themselves preferably parallel and planar, and a pair of opposing end surfaces 37 and 39 which, also are preferably parallel and planar.

Each filter bar 32 of filter 30 includes a plurality of elongate grooves 42 formed in at least one side thereof, such as side 34, for example. Preferably, grooves 42 are formed by any of the techniques described above with respect to the formation of grooves 22 in filter 10 and, most preferably, by photochemical etching. It is also preferred that grooves 42 be uniformly spaced along side 34 of each filter member 32, although this is not essential.

In fabricating filter 30, a desired number of filter bars 32 are selected and permanently mounted to each other in horizontally stacked relation with side 34 of each member being in surface to surface contact with the side 36 of an immediately adjacent filter bar 32. Grooves 42, which may be in either or both contacting surfaces, define a plurality of vertical liquid flow paths through the filter at an interface 37 of each contacting pair of filter bars 32. The paths each run between a liquid inlet end 42a at the top surfaces of each adjacent pair of members 32 and a liquid outlet end 42b (FIG. 7) at the bottom surfaces of such members.

Any number of filter members 32 may be assembled in the above fashion to define a filter having an overall liquid inlet surface 44 and an overall liquid outlet surface 45, such overall liquid inlet and outlet surfaces being defined by the preferably coplanar continuum of the top and bottom surfaces 38 and 40, respectively, of the stacked filter bars.

Alternatively, if desired, the top and bottom surfaces of each filter member may be curved to form an arc of a circle so that the liquid inlet and outlet surface may be curved either concave or convex, if such were desired. In theory, therefore, the members comprising filter 30 may be shaped as segments of an overall form which is completed when a desired number of such members are properly stacked together.

As with filter 10, adjacent filter bars 32 of filter 30 are permanently bonded together at opposing side surfaces thereof and at least one such side surface of each bar 32 includes grooves 42 therein. Diffusion bonding is preferred, since it is exceptionally strong and long lasting, although, as stated above, bars 32 may, alternatively, be adhesively bonded together.

In operation, liquid is impinged upon liquid inlet surface 44 where it will pass into inlets 42a of grooves 42 and then through grooves 42 and out of the filter through outlets 42b. Filterable particles in the liquid are collected mostly on surface 44, with the filtered liquid passing through grooves 42. To facilitate the filtering process, a filtering aid, such as diatomaceous earth or the like, may be spread over surface 44 prior to filter use. Occasionally, filter 30 will have to be washed to remove the accumulated filtered particles on surface 44.

Yet another embodiment of this invention, filter 46, is shown in FIGS. 8–9. Filter 46 is comprised of at least two filter members 48 and 49, which members are preferably dimensionally identical and are preferably horizontally stacked. Desirably, at least two pairs of filter members 48 and 49 are used to form a complete filter 46. Each filter member 48 and 49 is in the form of an elongate bar having opposing sides 50/52 and 50'/52', respectively, which are preferably planar and parallel, a pair of opposing top and bottom surfaces 54/56 and 54'/56', respectively, which are also preferably planar and parallel, and a pair of opposing end surfaces 55/57 and 55'/57', respectively.

A plurality of grooves 58 are formed in at least one side of each filter member. For purposes of example, a plurality of grooves 58 are shown formed only in side 50 of each filter member 48. Grooves 58 are preferably uniformly spaced and each extends from an inlet 58a at top surface 54 to a point 59 preferably intermediate top surface 54 and bottom surface 56. Grooves 58 are preferably formed by a chemical etching process, although, as with grooves 22 and 42, they may, for example, be stamped or printed. Further, grooves 58 may be any desired shape, but are preferably substantially rectangular in shape.

As with filter members 48, each of filter members 49 includes a plurality of elongate grooves 58' formed in side 50' and extending from bottom surface 56' to a point 61 intermediate surfaces 54' and 56'. As with grooves 58, grooves 58' are preferably uniformly spaced on surface 50'. It is important that the spacing of grooves 58 be the same as that of grooves 58' for the reasons discussed below. Each filter member 49 further includes a plurality of holes 60 each extending therethrough between sides 50' and 52' from the terminal point 61 of a distinct groove 58' in a direction substantially perpendicular to said groove.

Filter 46 is assembled by permanently mounting together a desired number of distinct pairs of filter members 48 and 49 in horizontally stacked relation with side 50 of each filter member 48 contacting a side 52' of an adjacent filter member 49 to form an interface 63, and side surface 50' of each filter member 49 contacting a side surface 52 of each filter member 48 to form an interface 65; and with top surface 54 of each filter member 48 being coplanar with top surface 54' of filter member 49 and bottom surface 56 of each filter member 48 being coplanar with bottom surface 56' of filter member 49. A liquid inlet surface 62 is defined by the planar continuum of top surfaces 54 and 54' of filter members 48 and 49, respectively, whereas a liquid outlet surface 67 is formed by the continuum of bottom surfaces 56 and 56'.

As stated above, it is important that the spacing between adjacent grooves 58 of filter member 48 be identical to the spacing between adjacent grooves 58' of filter member 49, although the dimensions of grooves 58 may differ slightly from those of grooves 58'. Identity of spacing is necessary so that when adjacent filter members 48 and 49 are joined together with side 50 of filter member 48 in surface to surface contact with side 52' of filter member 49, holes 60 will provide liquid flow communication between grooves 58 and grooves 58' thereby defining a plurality of tortuous liquid flow paths through filter 46.

As with filters 10 and 30, filter 46 may be specially fabricated to filter liquids having any desired level of viscosity, as well as to filter a given liquid at any desired liquid flow rate. This is accomplished by forming the holes and grooves of a shape, size and configuration appropriate to accommodate the particular liquid to be filtered at the desired liquid flow rate.

Further, as with each filter of this invention, filter 46 is relatively leakproof and can withstand high liquid pressures since, as with the other filters of this invention, adjacent filter members are preferably diffusion bonded together.

Although the present invention has been described with reference to a number of specifically illustrated embodiments, the invention is not to be so limited. Rather, the invention is deemed to include obvious modifications and alterations to the specific embodiments above described.

For example, and as stated above, the grooves defined at the interface of opposing filter members of a filter of this invention may be formed in either or both opposing contacting filter member surfaces. Further, and with reference to filter 30, the grooves formed therein may not be perfectly straight as shown. Rather, they may, if desired, follow a tortuous path between inlet and outlet openings 42 and 42b, respectively.

Also, and as indicated above, each filter 10, 30 and 46 may have overall shapes other than a flat rectangular or square shaped prism. For instance, they may be cubical, conical or spherical, such shapes necessitating differently dimensioned adjacent filter members, however.

As another example, and with reference to filter 46, grooves 58' of filter member 49 may be replaced with verticle apertures that are formed within said member and provide communication between horizontal holes 60 and bottom surface 56'. Thus, side 50' would contain no grooves so that a complete filter could be formed with just two filter members 48 and 49, which could be made of any desired width.

Other modifications and changes may be made to the specifically illustrated embodiments of this invention without departing from the spirit and scope of the invention.

What is claimed is:

1. A filter for liquids comprising first and second nonporous substantially planar filter members having opposing sides in continuous surface to surface contact with one another, with an interface area defined between said sides, at least one of said sides including an elongated groove formed therein at said interface area, first filter member including a first hole therethrough in communication with the groove and the second filter member including a second hole therethrough in communication with the groove, the first hole being completely out of register with said second hole so that a tortuous liquid flow path is formed through the filter from said first hole through said groove to said second hole.

2. The filter of claim 1, wherein:
   a. the plates each include a multiplicity of holes therethrough which are arranged in the same spatial pattern on each plate with the holes in the first plate being completely out of register with the holes in the second plate; and
   b. a multiplicity of elongated grooves are defined in at least one of the contacting sides at said interface area, the grooves being arranged to provide liquid flow communication between the holes in the first plate and the holes in the second plate, a multiplicity of tortuous liquid flow paths thereby being defined through the filter.

3. The filter of claim 2, wherein each plate is fabricated of a noncorrosive material and wherein the plates are permanently bonded together at said opposing sides.

4. The filter of claim 1, wherein:
   a. the groove extends from the top surface of the first elongate bar to a terminal point above the bottom surface of said first elongate bar; and
   b. the second elongate bar includes a liquid flow path therethrough between an inlet end in communication with the groove at said terminal point and an outlet end communicating without said second elongate bar.

5. The filter of claim 4, wherein each elongate bar includes another side not in contact with the other elongate bar, and wherein the second elongate bar further comprises:
   a. an outlet groove formed in said other side of said second elongate bar and extending from the bottom surface of the second elongate bar to a junction point between the top and bottom surface of the second elongate bar; and
   b. an aperture formed through the second elongate bar and communicating between said terminal point of the groove in the first elongate bar and said junction point, said liquid flow path through the second elongate bar being defined by said aperture and outlet groove.

6. The filter of claim 4, wherein:
   a. the first elongate bar includes a plurality of grooves each extending between the top surface of said first elongate bar and a terminal point above the bottom surface of said first elongate bar; and
   b. the second elongate bar includes a plurality of liquid flow paths providing liquid flow communication through the second elongate bar between the grooves in said first elongate bar and the ambient environment.

7. A method of fabricating a filter for liquids including first and second nonporous filter members having opposing sides in continuous surface to surface contact with one another with a liquid flow path defined at the interface of the filter members, the method comprising the steps of:
   a. forming a groove in at least one of said opposing sides so that said groove is out of communication with the edges of said filter members;
   b. mounting the members together with said opposing sides in continuous contact with one another at a location whereby said groove is defined at the interface; and
   c. providing said filter members with nonregistering holes which extend from the non-contacting surfaces of their respective filter members into communication with said groove.

8. The method of claim 7, wherein the forming step includes etching the groove into at least one of said opposing sides.

9. The method of claim 8, wherein the etching step includes chemical etching.

10. The method of claim 9, wherein the chemical etching step includes photochemical etching and wherein the mounting step includes diffuse bonding the members together with said opposing sides in continuous contact with one another at said location.

11. The method of claim 7, wherein the mounting step includes permanently bonding the members together with said opposing sides in continuous contact with one another at said location.

12. The method of claim 11, wherein the permanent bonding step includes diffusion bonding.

* * * * *